US008065720B1

(12) United States Patent
Ebrahimi et al.

(10) Patent No.: US 8,065,720 B1
(45) Date of Patent: Nov. 22, 2011

(54) TECHNIQUES FOR MANAGING SECURE COMMUNICATIONS

(75) Inventors: Hashem M. Ebrahimi, Salt Lake City, UT (US); Stephen R Carter, Spanish Fork, UT (US); Mel J Oyler, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 1031 days.

(21) Appl. No.: 10/752,385

(22) Filed: Jan. 6, 2004

(51) Int. Cl.
*G06F 9/00* (2006.01)

(52) U.S. Cl. ............... 726/12; 726/11; 726/13; 726/14; 726/22; 726/26; 27/28; 713/154; 713/167; 709/217; 709/218; 709/219; 709/246

(58) Field of Classification Search .................. 726/11, 726/12, 13, 14, 22, 26–30; 713/200–202, 713/156, 161, 167; 3/11, 12, 13, 14, 22; 709/217–219, 246
See application file for complete search history.

(56) References Cited

U.S. PATENT DOCUMENTS

| | | | |
|---|---|---|---|
| 5,550,984 A | 8/1996 | Gelb | 395/200.17 |
| 5,553,239 A | 9/1996 | Heath et al. | 395/187.01 |
| 5,657,390 A | 8/1997 | Elgamal et al. | 380/49 |
| 5,673,322 A | 9/1997 | Pepe et al. | 380/49 |
| 5,757,924 A | 5/1998 | Friedman et al. | 380/49 |
| 5,768,271 A | 6/1998 | Seid et al. | 370/389 |
| 5,805,803 A | 9/1998 | Birrell et al. | 395/187.01 |
| 5,825,890 A | 10/1998 | Elgamal et al. | 380/49 |
| 5,889,996 A | 3/1999 | Adams | |
| 5,913,025 A | 6/1999 | Higley et al. | 395/187.01 |
| 5,913,825 A | 6/1999 | Watanabe et al. | 395/187.01 |
| 5,963,915 A | 10/1999 | Kirsch | 705/26 |
| 5,991,810 A | 11/1999 | Shapiro et al. | 709/229 |
| 6,003,084 A | 12/1999 | Green et al. | |
| 6,029,245 A | 2/2000 | Scanlan | 705/26 |
| 6,065,120 A | 5/2000 | Laursen et al. | |
| 6,081,900 A * | 6/2000 | Subramaniam et al. | 726/19 |
| 6,128,644 A | 10/2000 | Nozaki | |
| 6,148,405 A | 11/2000 | Liao et al. | |
| 6,192,477 B1 | 2/2001 | Corthell | 713/201 |
| 6,199,165 B1 | 3/2001 | Grunner | 713/201 |
| 6,233,577 B1 | 5/2001 | Ramasubramani et al. | |
| 6,233,608 B1 | 5/2001 | Laursen et al. | |
| 6,263,437 B1 | 7/2001 | Liao et al. | |
| 6,324,648 B1 * | 11/2001 | Grantges, Jr. | 726/12 |

(Continued)

OTHER PUBLICATIONS

Chris Nettleton, "GCC-ERC32 User's Guide C/C++ Compilation System for Spacecraft Microprocessors; 1.6. Options to Request or Suppress Warnings", 1999, obtained from http://www.xgc.com/manuals/gcc-erc32-ug/p2node8.html.*

(Continued)

*Primary Examiner* — Edan Orgad
*Assistant Examiner* — Canh Le
(74) *Attorney, Agent, or Firm* — Schwegman, Lundberg & Woessner, P.A.

(57) ABSTRACT

Methods and systems for managing secure communications are provided. An external client establishes secure communications with a secure site. During the secure session, the external client attempts to access potentially insecure references. These potentially insecure references are inspected before being made available to the external client. In some instances, the potentially insecure references are translated into secure references, which suppress normally occurring security warning messages that are issued to the external client. In other instances, the potentially insecure references are processed by a proxy on behalf of the external client and appear to the external client to occur within the secure session.

9 Claims, 3 Drawing Sheets

U.S. PATENT DOCUMENTS

| | | | |
|---|---|---|---|
| 6,434,687 B1 | 8/2002 | Huppenthal | |
| 6,473,800 B1* | 10/2002 | Jerger et al. | 709/226 |
| 6,640,302 B1 | 10/2003 | Subramaniam et al. | |
| 6,732,269 B1 | 5/2004 | Baskey et al. | |
| 6,745,229 B1 | 6/2004 | Gobin et al. | |
| 6,950,936 B2 | 9/2005 | Subramaniam et al. | |
| 6,961,759 B2* | 11/2005 | Brown et al. | 709/217 |
| 7,007,299 B2* | 2/2006 | Ioele et al. | 726/14 |
| 7,093,121 B2* | 8/2006 | Barton et al. | 713/150 |
| 7,370,351 B1* | 5/2008 | Ramachandran et al. | 726/8 |
| 7,430,757 B1 | 9/2008 | Chari et al. | |
| 7,552,223 B1 | 6/2009 | Ackaouy et al. | |
| 7,904,951 B1 | 3/2011 | Hashem et al. | |
| 2002/0056033 A1 | 5/2002 | Huppenthal | |
| 2002/0068554 A1* | 6/2002 | Dusse | 455/419 |
| 2003/0061387 A1* | 3/2003 | Brown et al. | 709/246 |
| 2003/0131259 A1* | 7/2003 | Barton et al. | 713/201 |
| 2003/0167403 A1 | 9/2003 | McCurley et al. | |
| 2003/0208570 A1* | 11/2003 | Lapidous | 709/222 |
| 2004/0073629 A1* | 4/2004 | Bazot et al. | 709/217 |

OTHER PUBLICATIONS

"A New Management and Security Architechture for Extranets", http://www.aventail.com/index.phtml/solutions/white_papers/aec_wp.phtml, (1196-1999), 1-14.

"CMS Proxy Server—White Paper", http://csm.alcyonis.fr/proxies.htm, (1995-1998), 1-13.

"CSM Proxy Server, the Ultimate Gateway to the Internet!", http://www.csm-usa.com/white/gateway.htm, no later than Aug. 4, 1998, 1-5.

"How the Proxy Works", http://gopher.texshare.utexas.edu/Current/AccessMeet/accessproxy/how.html, (Jul. 22, 1998), 1-2.

"Info needed to write https proxy", http://www.netsys.com/firewalls-9604/0406.html, (Apr. 11, 1996), 1.

"Microsoft Proxy Server", http://www/microsoft.com/proxy/guide/whatsnew.asp?a=2&B=1, no later than Aug. 4, 1998, 1-4.

"Microsoft Proxy Server Proxy vs. Border Manager", http://microsoft.com/proxy/comparisons/bulletin.asp?A=4&B=4, (1998), 1-8.

"NetSafteV3.0 The Firewall Solution from Siemens Nixdorf", http://www.swn.sni.be/NetSafe.htm, (May 31, 1997), 1-3.

"Netscpe Proxy Server Administrator's Guide Version 3.5 for Unix", http://developer.netscape.com/docs/manuals/proxy/adminux//contents.htm, (1997).

"OWF Basics", http://www.omnigroup.com/MailArchive/OmniWeb-dev/Current/0002.html, (1997),1-2.

"r3 CypherClient", http://www.r3.ch/products/cypher/cypherclient.html, (1998), 1-4.

"Submission: HTTPS v1.0 PAckage for OmniWeb 3x (Rhapsody)", http://www.plsys.co.uk.MailingLists/uk-next-announce.msg00251.html, (Jan. 24, 1998).

"Virtual Private Networking: An Overview", *Microsoft* http://www.microsoft.com/workshop/sever/feature/vpnovw.asp, no later than Feb. 25, 1998.

"Webroute 1.3.0", http://www-miaif.lip6.fr/willy/pub/webroute/v1.3/untared/CHANGES, (1997), 1-2.

"WebSTAR Security Toolkit: Troubleshooting", http://www.starnine.com/support/qa/webstarssl/ssltroubleshoot.html, 1-2.

Elgamal, Taher, et al., "Securing Communications on the Intranet and Over the Internet", http://www.netscape.com/newsref/ref/128bit.html, (Jul. 1996), 1-12.

Feibel, Werner, "Novell's Complete Encyclopedia of Networking", San Jose, CA : Alameda, CA : Novell Press ; Sybex, (1995),625-630.

Ferguson, Paul, et al., "What is a VPN?", *Ferguson & Hutson, Revision 1*, (Apr. 1998), 1-22.

Schneider, Bruce, "Applied Cryptography Protocols, Algorithms, and Source Code in C", *New York : Wiley*, (1994),436-437.

Tanenbaum, Andrew S., "Computer Networks", Upper Saddle River, N.J. : *Prentice Hall PTR, 3d Edition*, (1996),28-29, 396-417, 601-621, and 681-695.

Zhong, Qun, et al., "Security Control for COTS Components", *Computer*, 31(6), (Jun. 1998),67-73.

"U.S. Appl. No. 09/493,506 Advisory Action mailed Oct. 25, 2002", 3 pgs.

"U.S. Appl. No. 09/493,506 Advisory Action mailed Nov. 30, 2001", 3 pgs.

"U.S. Appl. No. 09/493,506 Final Office Action mailed Jan. 30, 2001", 7 pgs.

"U.S. Appl. No. 09/493,506 Final Office Action mailed Mar. 18, 2003", 7 pgs.

"U.S. Appl. No. 09/493,506 Final Office Action mailed Aug. 12, 2002", 9 pgs.

"U.S. Appl. No. 09/493,506 Non Final Office Action mailed Mar. 26, 2002", 8 pgs.

"U.S. Appl. No. 09/493,506 Non Final Office Action mailed Sep. 15, 2000", 8 pgs.

"U.S. Appl. No. 09/493,506 Non Final Office Action mailed Nov. 26, 2002", 6 pgs.

"U.S. Appl. No. 09/493,506 Notice of Allowance mailed Jun. 5, 2003", 8 pgs.

"U.S. Appl. No. 09/493,506, filed Feb. 26, 2003 to Non Final Office Action mailed Nov. 26, 2002", 4 pgs.

"U.S. Appl. No. 09/493,506, filed Apr. 20, 2001 to Final Office Action mailed Jan. 30, 2001", 6 pgs.

"U.S. Appl. No. 09/493,506, filed May 16, 2003 to Final Office Action mailed Mar. 18, 2003", 4 pgs.

"U.S. Appl. No. 09/493,506, filed Jun. 26, 2002 to Non Final Office Action mailed Mar. 26, 2002", 14 pgs.

"U.S. Appl. No. 09/493,506, filed Oct. 15, 2002 to Final Office Action mailed Aug. 12, 2002", 5 pgs.

"U.S. Appl. No. 09/493,506, filed Nov. 7, 2000 to Non Final Office Action mailed Sep. 15, 2000", 7 pgs.

"U.S. Appl. No. 09/493,506, filed Dec. 10, 2001 to Advisory Action mailed Nov. 30, 2001", 9 pgs.

"U.S. Appl. No. 10/650,211 Non Final Office Action mailed Sep. 8, 2004", 20 pgs.

"U.S. Appl. No. 10/650,211 Notice of Allowance mailed May 2, 2005", 11 pgs.

"U.S. Appl. No. 10/650,211, filed Dec. 3, 2004 to Non Final Office Action mailed Sep. 8, 2004", 9 pgs.

"U.S. Appl. No. 10/814,983 Non Final Office Action mailed Aug. 22, 2007", OARN,15 pgs.

Cohen, E., et al., "Improving End-to-End Performance of the Web Using Server Volumes and Proxy Filters", *Proceedings of the ACM SIGCOMM, Conference on Applications, Technologies, architectures, and protocols for computer communication*,28(4), (1998).

Dierks, T., et al., "RFC2246: The TLS Protocol Version 1.0", *The Internet Society*, (1999),1-80.

"U.S. Appl. No. 10/814,983, filed Nov. 21, 2007 in response to Non-Final Office Action mailed Aug. 22, 2007", 11 pgs.

"U.S. Appl. No. 10/814,983 Final Office Action mailed Feb. 1, 2008", 3 pgs.

Appeal, S., "[SSL-Talk List FAQ] Secure Sockets Layer Discussion List FAQ v1.1.1", http://www.faqs.org/faqs/computer-security/ssl-talk-faq/,(Nov. 16, 1998),22 pgs.

Dierks, T., "Modifications to the SSL protocol for TLS <draft-ieft-tis-ssl-mods-00.txt>", http://www3.tools.ietf.orf/html/draft-ietf-tls-ssl-mods-00, (Nov. 26, 1996).

Elgamal, T., "The Secure Sockets Layer Protocol (SSL)", http://www3.ietf.org/proceedings/95apr/sec/cat.elgamal.slides.html,(Apr. 1995).

Loutonen, A., "Tunneling TCP based protocols through Web proxy servers", http://tools.ietf.org/id/draft-loutonen-web-proxy-tunneling-01.txt,(Aug. 1998),9 pgs.

Rabinovich, M, et al., ""Web Caching and Replication" © 2001 Addison Wesley Professional", 60-92.

* cited by examiner

TECHNIQUES FOR MANAGING SECURE COMMUNICATIONS

CROSS-REFERENCE TO RELATED APPLICATIONS

The current application is related to co-pending and commonly assigned U.S. application Ser. No. 10/650,211 entitled "Secure Intranet Access," filed on Aug. 8, 2003, which is a continuation of U.S. Pat. No. 6,640,302. U.S. Pat. No. 6,640,302 is also a divisional of issued U.S. Pat. No. 6,081,900. The disclosures of these three matters are incorporated by reference herein and below.

FIELD OF THE INVENTION

The present invention relates to network security and in particular to techniques for managing secure communications.

BACKGROUND OF THE INVENTION

Increasingly, individuals are accessing resources over the World-Wide Web (WWW) using Internet browsers. In many instances, these communications are made in an insecure fashion using non-secure protocols, such as Hypertext Transfer Protocol (HTTP). In other instances, these communications are made in secure fashion using secure protocols, such as HTTP over Secure Sockets Layer (SSL) referred to as HTTPS.

Secure access is often needed when the resources are subject to security access policies. For example, an enterprise's Intranet website which includes internal enterprise resources and information is normally only available to employees through secure Internet communications, such as HTTPS. The employees authenticate to the Intranet website and then remotely communicate with the resources of the Intranet via the Internet using HTTPS.

During secure sessions with a secure site, an individual can use a browser to perform a variety of transactions. These transactions can reference links to internal or external information or can reference links to internal of external sites. External information or external sites may or may not be within the control or purview of the secure site. Thus, there is a potential that when a transaction attempts to access external information or an external site that the access attempt may create a security issue or security hole during the secure session.

As a result, traditional Internet browsers are equipped with logic to detect these situations and to generically issue security warnings via browser interfaces. However, in many instances, these messages are not correct, that is, the information or site that is attempting to be accessed is often not a security problem. Moreover, in many instances, these messages are not particularly informative to the individuals as to the true security risk associated with the information or site that is attempting to be accessed.

Thus, individuals experience numerous service interruptions during a secure session which requires them to manually inspect and disregard any unnecessary security warnings. Moreover, these security warnings are often too generic to provide individuals with any meaningful assessment as to the true security risk associated with access attempts to potentially insecure information or sites. Accordingly, these service interruptions affect an individual's overall efficiency and comprehension of information during the secure session and are not desired or useful.

Therefore, there is a need for improved techniques for managing secure communications, such that unnecessary security warnings are suppressed and security threats are more meaningfully communicated.

SUMMARY OF THE INVENTION

In various embodiments of the present invention, techniques for managing secure communications are described. An external client residing on an external site establishes a secure session with a secure site over a network. During that secure session, the external client makes a number of transactions; some of these transactions are associated with potentially insecure communications. These potentially insecure communications are inspected in advance of making them available to the external client and zero or more actions are performed based on that inspection.

More specifically, and in one embodiment of the invention, a method for managing secure communications is presented. A secure session is established on a secure site with an external client, which communicates from an insecure site. Access attempts are detected during the session which is directed to potentially insecure transactions. The access attempts are transparently managed by inspecting the access attempts before making them available to the external client.

In another embodiment of the present invention, another method for managing secure communications is provided. Potentially insecure transactions occurring during a secure session are detected, the insecure transactions result from actions requested by an external client participating in the secure session. The potentially insecure transactions are inspected in advance of satisfying the actions requested and a determination is made for permitting the insecure transactions to proceed unmodified by performing the actions requested for the external client, permitting the insecure transactions to proceed in a modified fashion, or denying the insecure transactions by denying the actions requested.

In still another embodiment of the present invention, a secure communications management system is described. The secure communications management system includes a secure communications manager and a proxy. The secure communications manager manages a secure session with an external client, which is associated with an insecure site. The proxy interacts with the secure communications manager in order to inspect potentially insecure communications requested by the external client during the secure session. Furthermore, the proxy selectively processes the potentially insecure communications on behalf of the external client within the secure session.

In yet another embodiment of the present invention, a secure communications management system is presented. The secure communications management system includes a secure session, secure reference links, and potentially insecure reference links. The secure reference links are accessible within the secure session and the potentially insecure reference links are accessible from the secure session. An external client associated with an external site establishes the secure session with a secure site. The external client references the secure reference links and the potentially insecure reference links during the secure session, and the potentially insecure reference links are inspected and modified in advance of being made available to the external client during the secure session.

Still other aspects of the present invention will become apparent to those of ordinary skill in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the invention, a secure session is discussed. A secure session is a communication dialogue that occurs between an external client and a secure site over a network, such as the Internet. In one embodiment, the secure communication is a HTTPS dialogue managed within an Internet browser that the external client uses for accessing the secure site. The communications occurring within the secure session on the secure site need not be secure (e.g., HTTP can be used), but communications between the external client and the secure site are secure (e.g., HTTPS). A technique for performing these translations between external clients associated with insecure sites and secure sites is described in U.S. Pat. Nos. 6,640,302 and 6,081,900 both commonly assigned to Novell, Inc. of Provo, Utah, both entitled: "Secure Intranet Access." The disclosures of these patents are hereby incorporated by reference herein.

An external client is a computing resource (e.g., device or application) or user that participates in the secure session. In one embodiment, the external client uses an Internet browser during the secure session to interact with the secure site and make access requests for information or services identified within the secure site. Some of the requested information or services are associated with potentially insecure transactions. Potentially insecure transactions are transactions that may or may not create a security hole or problem during the secure session.

For example, a WWW browser page that resides within the domain of the secure site may include reference links to other sites or information that is not identified as being secure by their embedded reference links. Thus, a secure WWW browser page (e.g., referenced by HTTPS) can include embedded links to another insecure browser page or site (e.g., referenced by HTTP). Conventionally, such a scenario would result in a security warning message being displayed within the browser to the external client. However, as will be described below in greater detail, this security warning need not always be displayed, need not always be displayed in generic and conventional manners, and need not always result in an insecure transaction that occurs during the secure session.

In one embodiment of this invention, the techniques presented herein for managing network traffic are implemented in the iChain® and Secure Excelerator products, distributed by Novell, Inc., of Provo, Utah. However, the teachings of the invention can be integrated and implemented in network protocols, proxies, network appliances, or any applications that are designed to manage secure communications in the manners described herein and below. All such implementations are intended to fall within the scope of the invention.

Figure 1:
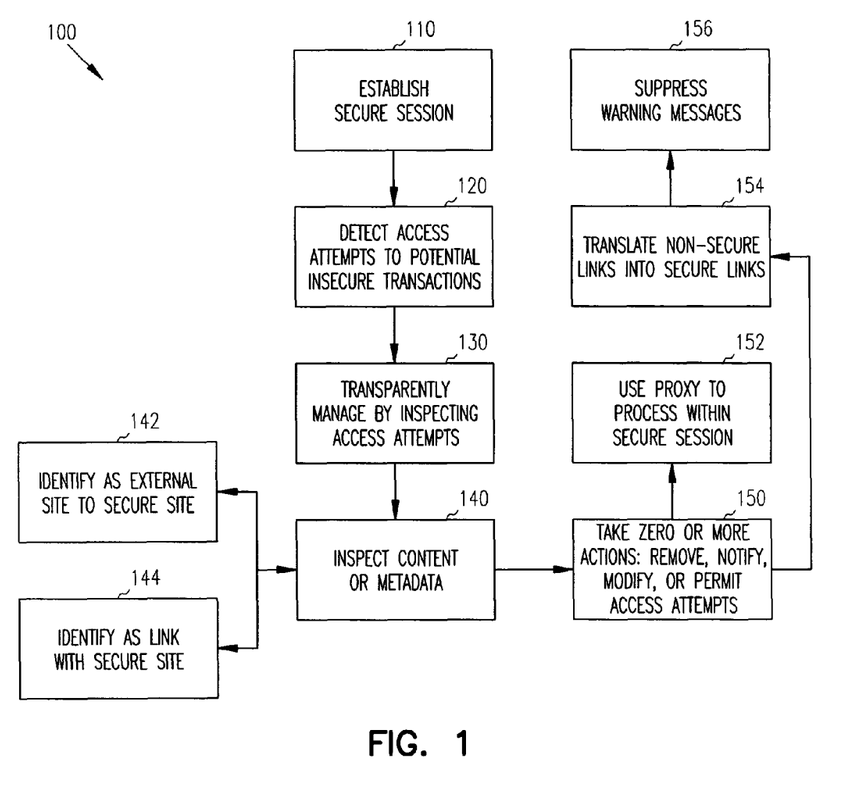
FIG. 1 is a flowchart representing a method for managing secure communications.

FIG. 1 illustrates a flowchart of one method 100 used for managing secure communications. The method can be implemented in one or more software applications residing on a secure site. The method's 100 processing is designed for managing securing communications between the secure site and an external client. The processing of the method 100 represents the actions taken by applications processing on the sequre site. Furthermore, in some embodiments, the processing of the method 100 is partially implemented in a proxy that is accessible from the secure site.

At 110, a secure session is established between an external client and a secure site. The secure session is established after the external client authenticates itself to the secure site. Moreover, in some embodiments, the secure session is carried out using HTTPS communications over the Internet using a WWW browser. During the secure session, the external client expects communications to be secure and the secure site expects its resources, information, and services to remain secure.

After the secure session is established, the external client begins to make a number of transactions with the resources, information, or sites controlled by the secure site. At some point during the secure session, at least some of these transactions will be detected at 120 as access attempts that are directed to potentially insecure transactions.

Potentially insecure transactions are references to resources, information, or sites that are not managed by secure communications (e.g., HTTPS). The transaction references are "potentially" insecure until a determination is made as to the true nature of these references. That is, references that are wholly contained and managed within the secure site may not be referenced internally (within the secure site) using secure communications (e.g., HTTPS) but these references are still secure since there is no way to access them outside the context of the secure site. These types of references are not actually insecure, although they appear to be insecure to the secure session, since they are not referenced by secure communications (e.g., HTTPS). Conventionally, these types of references would trigger security warnings within the external client's WWW browser during the secure session, creating confusion and inconvenience for the external client.

Other potentially insecure transactions can include references to sites that are known to, controlled by, or trusted by the secure site. Again, in these instances the references are not actually insecure once it is determined that the sites are acceptable to the secure site. Conventionally, any potentially insecure transaction would generate a security warning or in some cases prevent access to the suspect reference. Here, these references are not considered insecure once their relationship and identity are established within the secure session.

Other types of potentially insecure references cannot be known to be unsafe or insecure until they are actually accessed. However, it is not desirable to permit the external client to directly access these references, since if a potentially insecure reference turns out to be actually insecure, the secure session will already be compromised as soon as the external client access there offending references. These types of insecure references will be processed and handled by a proxy acting on behalf of the external client in the manners discussed below.

Correspondingly, at 130, the access attempts that are associated with potentially insecure references are transparently managed and inspected by the processing of the method 100 in order to determine what action should be taken on them, if any. One technique that can be used for inspecting the access attempts is to pre-acquire the information associated with the requested access attempts in cache or storage and scan the contents or metadata associated with the information, as depicted at 140.

During the inspection, the contents or metadata of the information that is desired by the external client's access attempt may identify embedded reference links to an external site not directly controlled by the secure site at 142 or may identify embedded reference links to other information wholly contained within or under the control of the secure site at 144. Moreover, the embedded reference links may be associated with secure or non-secure communications. This information is also part of the embedded reference links.

Next, at 150, based on the inspection, the processing of the method 100 takes zero or more actions against the pre-acquired information before making the pre-acquired information available to the external client in order to satisfy the access attempt made by the external client.

If the access attempt is associated with an external site that is not known to or trusted by the secure site, then, at 152, a proxy can be used to process the external client to the external site and process any additional actions performed by the external client at that external site, within the secure session. One technique for doing this is using the secure intranet techniques described in U.S. Pat. Nos. 6,640,302 and 6,081,900 both commonly assigned to Novell, Inc. of Provo, Utah. The disclosures of these patents are hereby incorporated by reference herein. These secure intranet techniques process insecure communications within a secure site (Intranet) on behalf of an external client and make them appear secure to the external client by translating HTTP requests to HTTPS requests and vice versa.

If the access attempt is associated with references to non-secure information that is wholly contained and available within the secure site, then at 154, the processing of the method 100 translates all non-secure references to secure references and makes the references available to the external client during the secure session. By performing this translation the external client's browser will not detect any potentially insecure references when it renders the information to the external client and as a result, the translation will effectively suppress normally occurring warning messages from being presented to the external client during the secure session at 156. This is a more accurate reflection of the true nature of the information requested by the external client, since that information is only available within the secure site during a secure session. Thus, with the teachings of this invention the external client is not bombarded with security warnings when such warnings are not accurate and not needed. This makes for a more meaningful user experience during the secure session and promotes better external client comprehension during the secure session.

In fact, a variety of actions can be performed at 140 once the potentially insecure references are inspected. For example, it may be determined that the insecure references are in fact potentially harmful and thus no action at all is performed. This will result in the external client's normal security warnings to be issued from within the browser with respect to the insecure references. In other embodiments, the potentially insecure reference can be deemed harmful based on a number of factors, such as a cookie being present which was added to the reference header. In these situations, the insecure reference can be removed entirely from the information presented to the external client, such that the external client is not capable of ever actually viewing or accessing the insecure reference. In addition, the access attempt associated with the insecure reference can be logged or sent as a notification to another security entity. Moreover, the processing of the method 100 can generate more specific and custom security messages for the external client that more accurately explains the security risk associated with the external client's attempt to access the insecure references.

In still other embodiments, the processing of the method 100 may determine that the access attempts being made by the external client are associated with references that are in fact under the control of known or trusted sites. In these, situations the access attempts are permitted to proceed by translating the insecure communication references (e.g., HTTP) into secure communication references (e.g., HTTPS), such that communications appear to be secure to the external client during the secure session. This also serves to suppress any naturally occurring security warning messages that the external client's browser would issue upon detecting the insecure communication references during the secure session.

The embodiments of FIG. 1 permit a more meaningful user experience and interaction during a secure session with a secure site. Secure communications are better managed with the embodiments of this invention. This is so, because conventionally a variety of non-useful and inaccurate security warnings often bombard a user during a secure session. However, the embodiments of this invention removes these unnecessary warnings and more closes manages and monitors the true nature of potentially insecure transactions that occur during the secure session, in order to take more intelligent action for and present better explained messages to the user.

Figure 2:
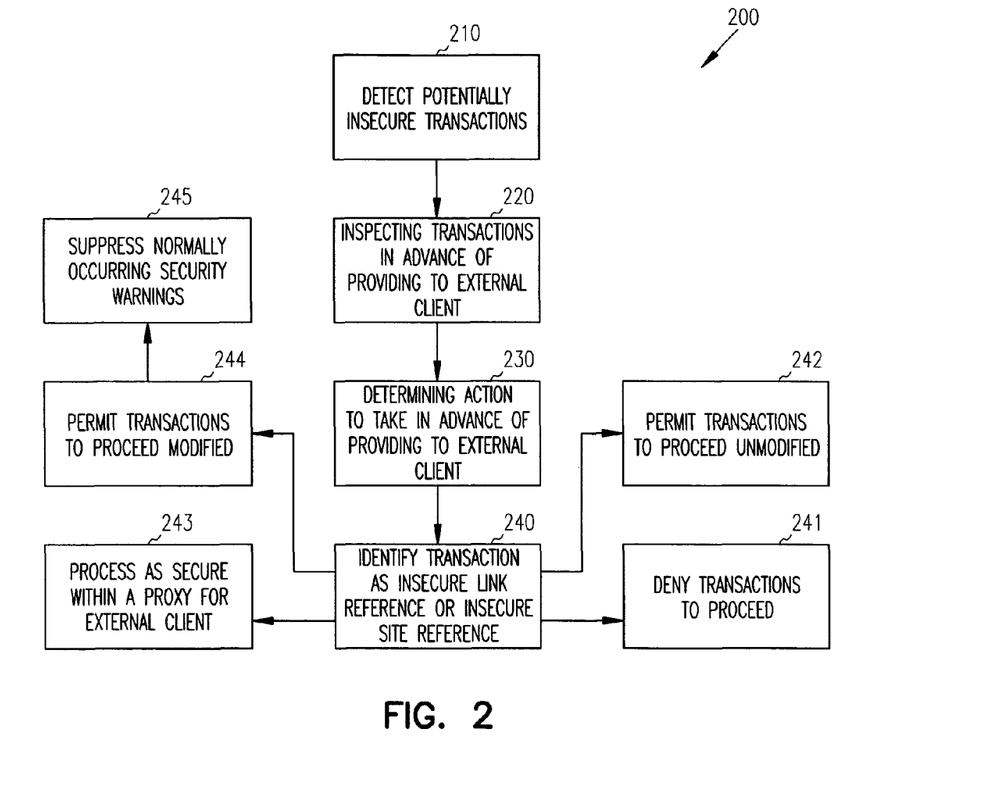
FIG. 2 is a flowchart representing another method for managing secure communications.

FIG. 2 is a flowchart representing another method 200 for managing secure communications. The processing of the method 200 is implemented in a computer readable and accessible medium and is embodied on a secure site. The processing of the method 200 interacts with a secure session being managed on a secure site between the secure site and an external client. The external client resides on an insecure site and accesses the secure site using secure communications over a network.

An external client establishes a secure session with a secure site. During that session, the client attempts to perform potentially insecure transactions at 210. An insecure transaction is potentially insecure if that transaction includes references to a resource, information, or a site using an insecure communication protocol or includes references to a resource, information or a site not known or under the control of the secure site.

One technique for determining if information includes potentially insecure transactions is to pre-acquire a WWW browser page requested by the external client and scan its contents for embedded reference links directed towards non-secure communications (e.g., HTTP) or directed towards links associated with resources, information, or sites not known to the secure site (this can be achieved by a lookup in a directory, data store, file, etc.).

If an external client's access attempt is determined to include potentially insecure references, then each of these potentially insecure references is more thoroughly inspected at 220. Inspection at 220 will determine if a potentially insecure reference is a secure reference, a low risk reference, or a true insecure reference. An example of a potentially insecure reference that turns out to be a secure reference, is a non secure reference (e.g., HTTP) to information that is wholly contained and accessed within the secure site (e.g., a file or program that is only accessed from within the secure site). A potentially insecure reference is a low risk reference when that reference is to an external site that is trusted by the secure site. A potentially insecure reference is a true insecure reference when the processing of the method 200 determines the content or metadata of the reference has been tampered with or is associated with a known insecure reference.

Based on the inspection, at 230, a determination is made to take zero or more actions on the content of the potentially insecure reference in advance of making that potentially insecure reference available to the external client in order to satisfy the external client's original access attempt for information which includes that potentially insecure reference. At 240, the determination can be based on whether the access attempt is associated with content that references information or resources available within the secure site or whether the access attempt is associated with content that references an insecure site.

If the access attempt is directed to information that is known to be insecure, then at 241, the access attempt can be denied and the external client will not be permitted to make any such attempt during the secure session. Moreover, in some embodiments, any such access attempt can be logged for subsequent reporting or dynamically sent to appropriate or interested security entities. In fact, other final states associated with the access attempt that is denied can also be logged or reported.

If the access attempt is directed to information that is considered low risk, then, at 242, no action is taken on the external client's access attempt at all. Consequently, the external client's browser will issue normally occurring security warning messages to the external client before the access attempt is permitted to proceed.

If the access attempt is for information that is not within the processing control of the processing of the method 200, then, at 243, the transactions associated with the access attempt can be performed within a proxy on behalf of the external client. When these transactions are performed, the non-secure communications (e.g., HTTP) are translated to secure communications (e.g., HTTPS) between the sites associated with the access attempt and the external client. This occurs transparently, such that the external client is unaware that the translation is occurring and such that the external client's WWW browser does not issue any security warning messages to the external client.

If the access attempt is for information that is within the processing control of the processing of the method 200, then, at 244, references made to the information are converted into secure communications and then provided to the external client. In other words, references to HTTP embedded links are converted to references to HTTPS embedded links. This, at 245, suppresses normally occurring security warning messages that the external client's WWW browser would typically issue when non-secure (e.g., HTTP) references are detected in information that is being presented to the external client during a secure session (e.g., HTTPS session).

In addition, in some embodiments, the processing of the method 200 may generate its own custom warning messages for the external client's access attempts and present these to the external client in place of what would normally be displayed by the external client's WWW browser. This permits the processing of the method 200 to more intelligently explain to the external client specific warnings regarding the information that the external client is attempting to access. For example, the processing of the method 200 may generate a WWW browser page or dialogue box that instructs the external client on how to access the information in a secure fashion from a different reference link that is preferred or warns the external client that if it proceeds the access attempt will be logged and reported to a security administrator.

The embodiments of FIG. 2 demonstrate how a secure session with a secure site is more intelligently managed, such that warnings are not continually displayed when not needed and such that only true security risks are identified and dealt with in more understandable manners to the external client. In this way, the embodiments of this invention improve the usability and management of a secure session and increase a secure session's efficiency and meaningfulness from the perspective of an external client that participates in the secure session.

Figure 3:
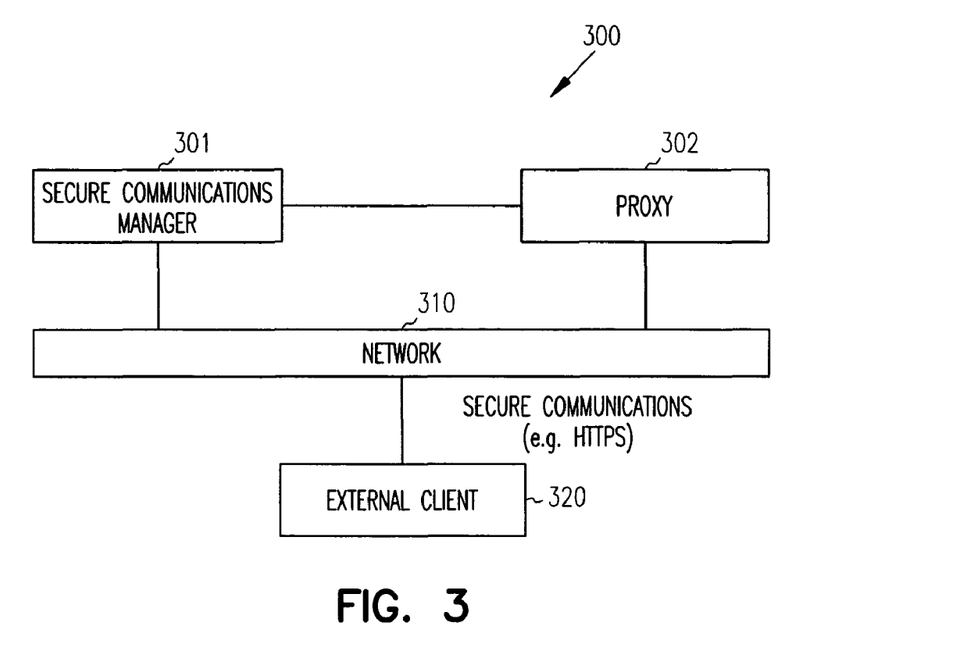
FIG. 3 is a diagram of a secure communications management system.

FIG. 3 is a diagram of a secure communications management system 300. The secure communications management system 300 is implemented in a computer readable and accessible medium. Furthermore, the secure communications management system 300 is interjected into the processing logic associated with a secure session that occurs between a secure site and an external client 320 over a network 310.

The secure communications management system 300 includes a secure communications manager 301 and a proxy 302. The secure communications manager 301 manages a secure session with the external client 320. The external client 320 is associated with an insecure site and communicates with the secure communications manager 301 over a network 310 using secure communications (e.g., HTTPS).

The secure communications management system 300 uses techniques for translating non secure communications into secure communications, such as by using a Secure Excelerator product that is provided by Novell, Inc. of Provo, Utah. This permits secure communications issued from the external client 320 to be converted into non-secure communications within the secure site and the results to be converted back into secure communications and presented to the external client 320. These techniques and there embodiments can be found in U.S. Pat. Nos. 6,640,302 and 6,081,900 both commonly assigned to Novell, Inc. of Provo, Utah, both entitled: "Secure Intranet Access." The disclosures of these patents are incorporated by reference herein. These techniques can be used by both the secure communications manager 301 and the proxy 302 of the secure communications manager system 300.

During the secure session, the external client 320 makes access attempts directed towards resources, information, services, or sites. These access attempts are typically embedded as link references within other information that the external client 320 is attempting to view within the secure session. For example, the external client may access a WWW page on the secure site during the secure session which includes embedded links to other resources, information, services, or sites. Before the WWW page is presented to the external client 320 for viewing and accessing, the secure communications manager 301 scans it for embedded references directed towards potentially insecure references.

A potentially insecure reference is one that is referenced by a non-secure communications protocol (e.g., HTTP) or one that is not contained within the secure site or under the direct control of the secure communications manager system 300.

When potentially insecure references are identified, they are inspected by the secure communications manager 301 to determine how, if at all, they should be processed or dealt with before they are presented to the external client 320, if at all. Thus, in some instances, the potentially insecure references are translated into secure references by the proxy 302 and made available to the external client 320 over the network 310. In other instances, the proxy 302 acts as an intermediary for the external client 320 and translates insecure references to secure references and vice versa, such that the external client believes that the transactions are occurring within the secure session. In still other embodiments, the secure communications manager 301 determines that the potentially insecure references are too risky and removes them entirely from any WWW page that is presented to the external client 320. In these latter embodiments, the secure communications manager 301 or the proxy 302 may generate custom warning messages that they present to the external client 320 during the secure session, may notify external security entities of the access attempts, or may record the access attempts to a security log for later evaluation or use.

Thus, the proxy 302 selectively processes the potentially insecure references on behalf of the external client 320 within the secure session. Any normally occurring security messages that are not needed are suppressed in the external client's WWW browser and custom warning messages can be generated to produce better explanations of security risks and actions as needed. Moreover, the external client 320 can process potentially insecure references safely via the proxy 302 during the secure session.

The embodiments of the secure communications manager system 300 permits better management of secure communications occurring between an external client and a secure site. This is achieved by translating between secure and non-secure communications, inspecting potentially insecure references in advance of providing them to the external client 320, and taking action on the potentially insecure references based on the true nature of those references in advance of providing them to the external client 320.

Figure 4:
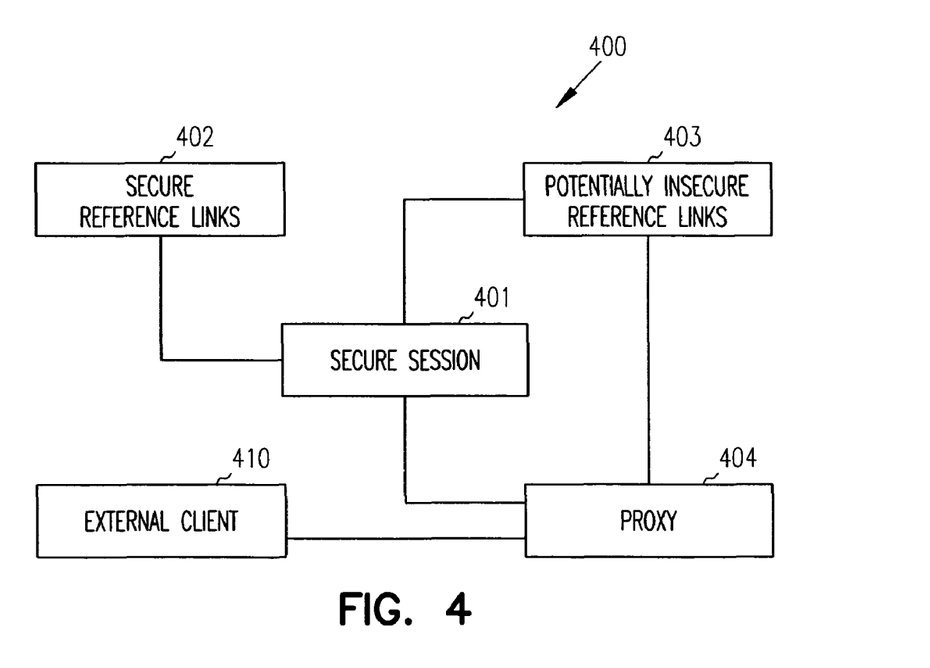
FIG. 4 is a diagram of another secure communications management system.

FIG. 4 is a diagram of another secure communications management system 400. The secure communications management system 400 is implemented in a computer readable and accessible medium. Furthermore, the secure communications management system 400 is implemented within a secure site that is accessible to an external client 410 associated with an insecure site. The external client 410 communicates with the secure site via a secure communications protocol, such as HTTPS. The external client 410 authenticates itself to the secure site in order to initiate the secure communications and begin a secure session with the secure site.

The secure communications management system 400 includes a secure session 401, secure reference links 402, potentially insecure reference links 403, and optionally a proxy 404. The reference links 401-402 are identifiers for or addresses to resources, information, services, or sites that the external client 410 can access during the secure session 401. The resources, information, services, or sites may physically reside within the secure site or may physically reside on sites external to the secure site.

As previously mentioned, the secure session 401 is initially created when the external client 410 logs into the secure site or otherwise authenticates (e.g., via the proxy 404) to the secure site. Once this is done, the external client 410 and the secure site and its resources communicate with one another via secure communications (e.g., HTTPS). A secure session can terminate normally (e.g., explicit log out request), terminate after a time-out (e.g., a configurable period of time during which no activity is detected by the client 410), or terminate abnormally (e.g., when a program, service, communication line fails).

During operation of the secure communications management system 400, the external client 410 accesses WWW pages, files, or other information that includes secure reference links 402 and potentially insecure reference links 403. Before these pages, files, or other information are rendered to the external client 410 for accessing and viewing, they are scanned to identify the potentially insecure reference links 403. The potentially insecure reference links 403 can be identified by references to a non-secure communications protocol (e.g., HTTP) or when references are identified as being part of a pre-defined list of acceptable or unacceptable references or when references are not recognized as being known to the secure site.

Once any potentially insecure reference links 403 are identified, actions can be performed on the potentially insecure reference links 403 before vending information that contains those potentially insecure reference links 403 to the external client 410.

One modification is to replace a number of the potentially insecure reference links 403 with secure communication protocols (e.g., HTTPS). This is useful when the potentially insecure references 403 are associated with resources, information, services, or sites that are wholly contained and controlled within the secure site. This may also be useful when the potentially insecure references 403 are associated with trusted resources, information, services, or sites to the secure site. In some embodiments, the modifications are dynamically performed within the proxy 404 during the secure session, such that the external client 410 is unaware of the translations occurring between secure and insecure communications and believes that all access is occurring normally during the secure session.

Another modification is to remove a number of the potentially insecure reference links 403 entirely from any information that is vended to the external client 410. This may be useful, when the removed references are known to be insecure or determined to have been tampered with in some way. For example, the metadata or header associated with a removed reference link may include a cookie. Alternatively, the removed reference may be a known site that is problematic to an enterprise. When a reference link is removed this event can be reported to a security entity, written to a log, associated with a custom warning message inserted into the vended information, or included with no additional information within the vended information, such that the external client 410 is entirely unaware that the reference link was removed from the vended information.

In some embodiments, it may be determined that normally occurring security messages that an external client's 410 WWW browser would normally issue in view of the potentially insecure references 403 should be issued. In these instances, the processing of the secure communications management system 400 can elect to take no action on the potentially insecure references 403.

The secure communications management system 400 permits secure communications occurring between a secure site and external client 410 to occur in more meaningful and less intrusive manners. This occurs because invalid or unneeded security warnings are suppressed, selective non secure communications can occur via proxy 404 in a secure fashion with the external client 410, and more meaningful actions or warnings can be custom developed and presented to the external client 410 for action when true security concerns arise during the security session.

Although specific embodiments have been illustrated and described herein, one of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method to manage secure communications executes in a proxy server, the method, comprising:
    establishing, by the proxy server, a secure session on a secure site with an external client that communicates from an insecure site;
    detecting, by the proxy server, access attempts during the secure session directed to insecure transactions, the insecure transactions identified as links to a site that is external (external site) to, not controlled by, and not recognized by the secure site, and the access attempts are directed to the insecure transactions having references to resources of the external site; and
    transparently managing, by the proxy server, the access attempts by pre-acquiring content from the external site by accessing the links on behalf of the external client to pre-acquire the content and by scanning and inspecting the content within the secure site before determining whether the content should be made available to the external client during the secure session, and at least one access attempt associated with at least one piece of the content that is scanned identifies a true insecure reference by determining that the true insecure reference is a particular reference that has been determined by the method to have had the piece of the content or metadata of the true insecure reference tampered with, and the true insecure reference is entirely removed from the content before the content is supplied to the external client and an event is reported as a custom warning inserted into the content supplied to the external client, the event identifies for the external client within the content that the true insecure reference was removed before being provided to the external client, and a number of other access attempts are associated with different content for other references that are secure but appear insecure, these other references are provided as secure references to the external client to suppress warning messages from being generated within the external client with these other access attempts made during the secure session.

2. The method of claim 1 wherein the detecting further includes translating any non-secure links into secure links for some of the insecure transactions before presenting results of the access attempts to the external client.

3. The method of claim 1 wherein managing includes at least one or more of:
    permitting normally occurring security warnings to present messages to the external client by taking no action;
    generating for and displaying to a custom warning message that is presented to the external client;
    issuing alerts, notifications, or advisories to a monitoring entity or log; and
    determining a number of the links are low-risk to or trusted by the secure site and thereby suppressing normally occurring security warnings from being presented to the external client.

4. A method to manage secure communications executes in a proxy server, the method, comprising:
    detecting, by the proxy server, insecure transactions occurring during a secure session, the insecure transactions result from actions requested by an external client participating in the secure session;
    inspecting, by the proxy server, the insecure transactions in advance of satisfying the actions requested by pre-acquiring content associated with the insecure transactions before making available to the external client, and the insecure transactions are associated with links to an external site located outside a secure site associated with the secure session, and content are pre-acquired from the external site via the links and inspected and scanned on behalf of the external client within the proxy server, and a number of references associated with some of the insecure references are determined to be secure, these references are translated to appear secure to the external client and when accessed by the external client suppress warning messages from occurring within the external client; and
    making, by the proxy server, a determination based on the inspection for taking processing actions including one or more of the following: permitting some of the insecure transactions to proceed unmodified by performing the actions requested for the external client;
    permitting, by the proxy server, some of the insecure transactions to proceed in a modified fashion; and denying some of the insecure transactions by denying the actions requested, and some of the insecure transactions that are denied are identified as references that have a World-Wide Web (WWW) cookie associated with their headers, and these references are entirely removed from the content before the content is supplied to the external client and the references entirely removed are reported as custom warning messages to the external client as an event within the content, the event identifies for the external client within the content that the true insecure reference was removed before being provided to the external client.

5. The method of claim 4, wherein the making a determination further includes, permitting some of the insecure transactions to proceed in the modified fashion by changing the reference links from Hypertext Transfer Protocol (HTTP) insecure links to HTTP over Secure Sockets Layer (HTTPS) in order to suppress security warning messages.

6. The method of claim 4 wherein the making a determination further includes permitting some of the insecure transactions to proceed unmodified by permitting normally occurring security warnings to be presented to the external client before satisfying the external client access attempt to reference the external site.

7. The method of claim 4 wherein the making a determination further includes permitting some of the insecure transactions to proceed in a modified fashion by transparently processing the external client access attempt within the proxy server making the external client access attempt appear to be part of the secure session.

8. The method of claim 4 wherein the making a determination further includes denying the some of the insecure transactions after determining that the external client access attempt is corrupted and notifying the external client of a denial.

9. The method of claim 4 wherein the making a determination further includes denying the some of the insecure transactions after determining that the external client access attempt is corrupted and logging information about the external client access attempt.

\* \* \* \* \*